(12) United States Patent
Samantaray et al.

(10) Patent No.: US 10,120,372 B2
(45) Date of Patent: Nov. 6, 2018

(54) EVENT PROCESSING BASED SYSTEM FOR MANUFACTURING YIELD IMPROVEMENT

(71) Applicant: Applied Materials, Inc., Santa Clara, CA (US)

(72) Inventors: Jamini Samantaray, San Ramon, CA (US); John Scoville, Phoenix, AZ (US)

(73) Assignee: Applied Materials, Inc., San Ramon, CA (US)

( * ) Notice: Subject to any disclaimer, the term of this patent is extended or adjusted under 35 U.S.C. 154(b) by 517 days.

(21) Appl. No.: 14/445,250

(22) Filed: Jul. 29, 2014

(65) Prior Publication Data
US 2015/0039118 A1 Feb. 5, 2015

Related U.S. Application Data

(60) Provisional application No. 61/861,120, filed on Aug. 1, 2013.

(51) Int. Cl.
*G05B 19/41* (2006.01)
*G05B 19/418* (2006.01)

(52) U.S. Cl.
CPC ........... *G05B 19/41875* (2013.01); *G05B 2219/32194* (2013.01); *Y02P 90/12* (2015.11); *Y02P 90/14* (2015.11); *Y02P 90/22* (2015.11)

(58) Field of Classification Search
None
See application file for complete search history.

(56) References Cited

U.S. PATENT DOCUMENTS

| 5,627,764 | A | 5/1997 | Schutzman et al. |
| 6,363,294 | B1* | 3/2002 | Coronel ............... H01L 22/20 257/E21.525 |
| 6,459,949 | B1* | 10/2002 | Black ............... G05B 19/41875 700/104 |
| 6,665,650 | B1 | 12/2003 | O'Grady, Jr. et al. |

(Continued)

FOREIGN PATENT DOCUMENTS

| TW | I225674 | 12/2004 |
| TW | 201113657 | 4/2011 |
| TW | I388953 | 3/2013 |

OTHER PUBLICATIONS

Notification of Transmittal of the International Search Report and the Written Opinion of the International Searching Authority for PCT/US2014/048960 dated Nov. 11, 2014, 13 pages.

*Primary Examiner* — Jason Lin
(74) *Attorney, Agent, or Firm* — Lowenstein Sandler LLP

(57) ABSTRACT

An event processing system identifies a process event associated with an identified defect in a manufacturing process. The event processing system selects a plurality of data elements from a manufacturing data source based on the process event. The manufacturing data source is associated with the manufacturing process during execution of the manufacturing process. During execution of the manufacturing process, the event processing system applies an event rule to the plurality of data elements to determine whether the event rule is satisfied. During execution of the manufacturing process, the event processing system performs a predefined action upon determining that the event rule is satisfied and selects additional data elements from the manufacturing data source upon determining that the event rule is not satisfied.

14 Claims, 4 Drawing Sheets

(56) References Cited

U.S. PATENT DOCUMENTS

| | | | |
|---|---|---|---|
| 6,952,653 B2* | 10/2005 | Toth | G01N 21/9501 382/149 |
| 2001/0000460 A1* | 4/2001 | Ishihara | G01N 21/88 382/149 |
| 2001/0016363 A1* | 8/2001 | Yano | H01L 22/26 438/9 |
| 2001/0020194 A1* | 9/2001 | Takagi | G01N 21/94 700/109 |
| 2001/0051836 A1* | 12/2001 | Lamey, Jr. | H01L 22/20 700/110 |
| 2002/0161532 A1* | 10/2002 | Dor | H01L 22/20 702/35 |
| 2003/0208286 A1* | 11/2003 | Abercrombie | G06Q 10/043 700/31 |
| 2004/0040003 A1* | 2/2004 | Seligson | G03F 7/705 382/151 |
| 2005/0131573 A1* | 6/2005 | You | G05B 19/4065 700/175 |
| 2005/0278052 A1 | 12/2005 | Bett et al. | |
| 2007/0219738 A1* | 9/2007 | Weiher | G05B 19/41875 702/82 |
| 2009/0136117 A1* | 5/2009 | Barkol | G01N 21/93 382/145 |
| 2009/0144691 A1* | 6/2009 | Rathsack | H01L 22/20 716/56 |
| 2009/0259961 A1 | 10/2009 | Baklin et al. | |
| 2010/0083029 A1* | 4/2010 | Erickson | G06F 11/0709 714/2 |
| 2011/0016514 A1* | 1/2011 | De Carlo | H04Q 9/00 726/5 |
| 2012/0216169 A1* | 8/2012 | Park | G01N 19/95607 716/136 |
| 2012/0317081 A1 | 12/2012 | Duvvoori et al. | |
| 2013/0144419 A1* | 6/2013 | Tsai | H01L 22/20 700/108 |
| 2013/0150997 A1* | 6/2013 | Tsai | C23C 16/52 700/121 |
| 2014/0006338 A1* | 1/2014 | Watson | G06F 17/30563 707/602 |

* cited by examiner

EVENT PROCESSING BASED SYSTEM FOR MANUFACTURING YIELD IMPROVEMENT

CROSS-REFERENCE TO RELATED APPLICATIONS

The present application is related to and claims the benefit of priority of U.S. Provisional Patent Application Ser. No. 61/861,120, filed Aug. 1, 2013, which is hereby incorporated by reference herein in its entirety.

The present application is related to U.S. patent application Ser. No. 13/929,615, entitled "Big Data Analytics System," filed on Jun. 27, 2013, which is hereby incorporated by reference herein in its entirety.

TECHNICAL FIELD

Implementations of the present disclosure relate to an event processing based system, and more particularly, to an event processing based system for manufacturing yield improvement.

BACKGROUND

Successful manufacturing depends on yield, as well as the efficiency in time-to-market. For example, semiconductor manufacturing depends on yield of wafers and dies, as well as the time to market of the wafers and dies. Manufacturers maximize the yield of products early in the product life cycle to maximize profit before the market becomes saturated with competing products. Early identification of manufacturing defects is critical to this process. The earlier a product defect can be identified, the greater the opportunity for minimizing product loss as a result of that defect.

Some traditional solutions that contribute to maximizing yield utilize Yield Management Software (YMS). A current YMS solution can use end-of-the-line yield to identify process events associated with a known defect in a manufacturing process after the manufacturing process has completed. The current YMS solution can correlate test results of the end-of-the-line yield to processes used throughout the line to locate opportunities to improve yield. Since the manufacturing process (e.g., of a wafer) may take several weeks to complete in a typical manufacturing facility, current YMS solutions are generally used after the manufacturing has completed to analyze the manufacturing process. Data can be analyzed after the production run is complete to identify how a product defect may have occurred. However, the analysis and identification of the defective product occurs after a defective product has already been produced. Moreover, these traditional solutions do not automate or apply the integration of any real-time information acquired via YMS analysis to future in-line metrology and process data.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to the same implementation, and such references mean at least one.

DETAILED DESCRIPTION

Figure 1:
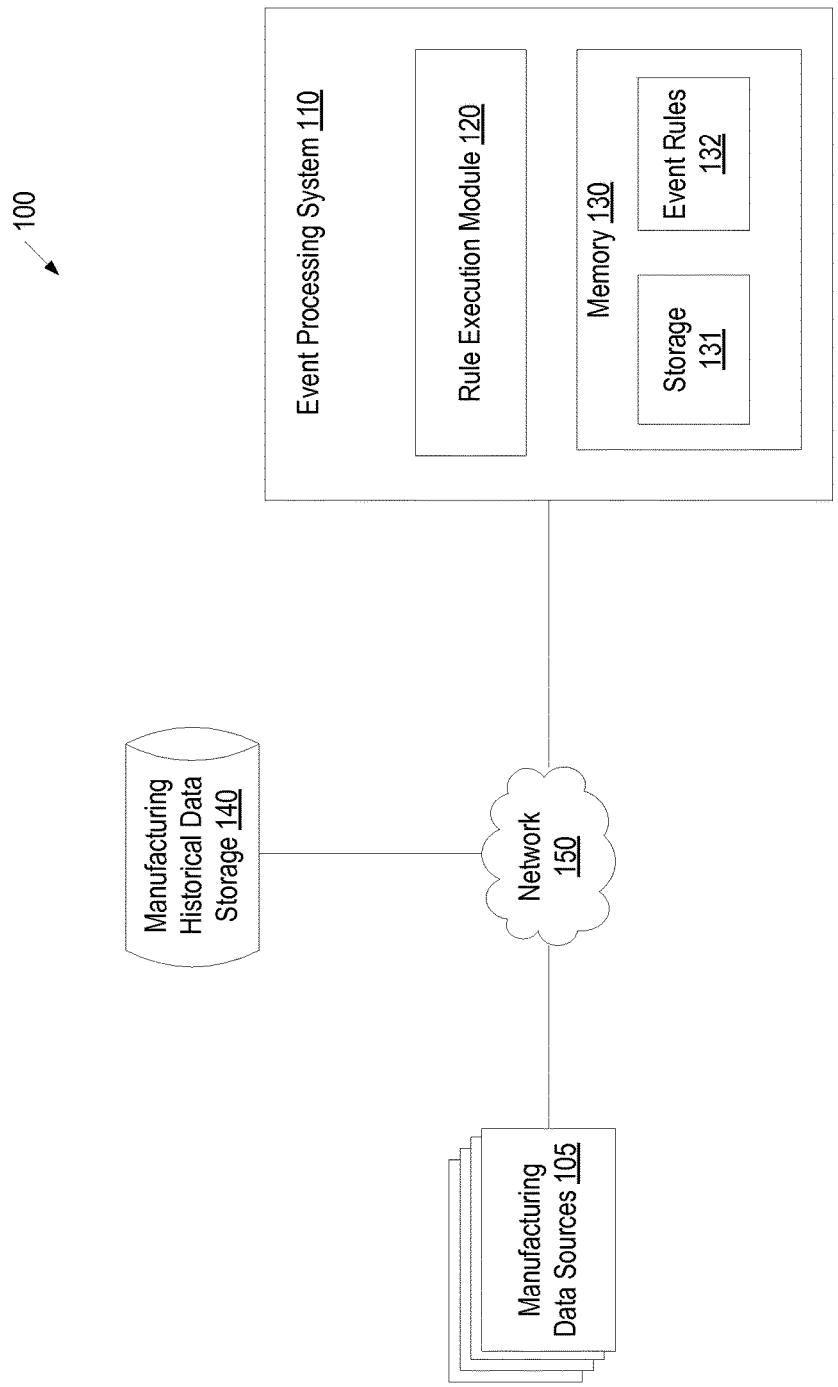
FIG. 1 is a block diagram illustrating a manufacturing system utilizing a rule execution module in accordance with an implementation.

Yield improvement desired by the manufacturing industry can be achieved using data collected in a manufacturing facility. However, with increasing amounts of data collected from a manufacturing facility, it may be difficult to effectively use the data to resolve a problem in the manufacturing facility during the execution of a manufacturing process. The manufacturing facility operations can strive for optimization of manufacturing processes to improve yields of materials and tools. The optimization may involve effective use of the large amount of data generated by the manufacturing facility in real-time, and the discovery of patterns and data trends through collection and analysis of the real-time data generated by the manufacturing facility. The collected data can be used to predict and resolve issues before the issues occur in the manufacturing facility. Predictive technology can be used to analyze the collected data to detect indicators of tool problems before the problems occur and to predict yield issues to allow in-line resolution. Yield improvement cycles can be shortened by applying the predictive analysis as the manufacturing process is executing and as data is generated by the tool, rather than once the manufacturing process has ended.

Storing and accessing the increasing amount of data collected in a manufacturing facility in real-time can impact on-line transaction processing (OLTP) requirements of factory automation. Moreover, the increasing amount of data may involve real-time analysis, which can lead to the deployment of additional engineering staff.

To improve yield by shortening yield improvement cycles, an event processing system can automatically apply rules and heuristics discovered through off-line analysis to data collected by data sources in a manufacturing facility in real-time, rather than at the end of the manufacturing line (e.g., once the manufacturing process has completed). The event processing system can analyze and control a complex series of interrelated events and data in a manufacturing process in real-time.

To shorten the yield improvement cycle, the event processing system can identify a process event that is associated with an identified defect in a manufacturing process. The event processing system can receive real-time data from a manufacturing data source that is associated with the manufacturing process. The event processing system can select data elements from the manufacturing data source in real-time based on the process event during the execution of the manufacturing process. The event processing system can store the selected data elements in memory-resident storage, such that the selected data elements are quickly accessible. By storing the real-time data in memory-resident data storage, the event processing system can perform processing of real-time data efficiently and effectively without impact to on-line transaction processing. Moreover, by storing the real-time data in storage that is easily accessible (e.g., memory-resident), the event processing system can store and process large amounts of data without an increase in engineering staff. During execution of the manufacturing process, the event processing system can apply an event rule to the selected data elements and perform a predefined action upon determining that the event rule has been satisfied. If the event rule has not been satisfied, the event processing system can continue selecting additional data elements from the manufacturing data source.

For example, a deviation or change in measurements from an in-line metrology tool may be caused by a change in recipe or because of a tool part in the in-line metrology tool. If similar cases that occurred in the past were a result of a specific tool part, and that tool part was changed in the recent past, there is a greater chance that the current metrology deviation occurred because of that tool part. The event processing system can automatically establish this relationship in real-time near the in-line metrology tool, allowing remedial action to be taken much sooner than can be done in traditional YMS-based systems. The event processing system can thus decrease the yield analysis cycle, improving yield and achieving faster time-to-market during the manufacturing process.

FIG. 1 is a block diagram illustrating a manufacturing system 100 utilizing a rule execution module in accordance with an implementation. The manufacturing system 100 can include for example, and is not limited to, a semiconductor manufacturing facility, a liquid crystal display (LCD) manufacturing facility, a solar panel manufacturing facility, etc. For brevity and simplicity, the manufacturing system 100 can include one or more manufacturing data sources 105, an event processing system 110, and a manufacturing historical data storage 140 communicating, for example, via a network 150. The network 150 can be a local area network (LAN), a wireless network, a mobile communications network, a wide area network (WAN), such as the Internet, or similar communication system.

The manufacturing data sources 105 can be manufacturing data sources, such as semiconductor manufacturing data sources. Examples of the manufacturing data sources 105 can include tools for the manufacture of electronic devices, a manufacturing execution system (MES), a material handling system (MHS), Semiconductor Equipment and Materials International (SEMI) equipment communications standard/generic equipment model (SECS/GEM) tools, an electronic design automation (EDA) system, etc.

The manufacturing data sources 105 and the event processing system 110 can be individually hosted by any type of computing device including, but not limited to, server computers, gateway computers, desktop computers, laptop computers, tablet computer, notebook computer, PDA (personal digital assistant), mobile communications devices, cell phones, smart phones, hand-held computers, or similar computing devices. Alternatively, any combination of the manufacturing data sources 105 and the event processing system 110 can be hosted on a single computing device including, but not limited to, server computers, gateway computers, desktop computers, laptop computers, mobile communications devices, cell phones, smart phones, hand-held computers, or similar computing devices.

Manufacturing historical data storage 140 can include one or more writable persistent storage devices, such as memories, tapes or disks. Although each of event processing system 110 and manufacturing historical data storage 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices. In some implementations, manufacturing historical data storage 140 can be storage that is distributed across multiple data systems, such as a distributed database.

During operation of the manufacturing system 100, the event processing system 110 can receive real-time data to be collected from one or more of the manufacturing data sources 105. Additionally, event processing system 110 can receive historical data from the manufacturing historical data storage 140. For example, the event processing system 110 can receive data in real-time from manufacturing data sources 105, and determine that additional data from a past event is to be utilized to analyze a particular event occurring during execution of the manufacturing process. The event processing system 110 may access the historical data from manufacturing historical data storage 140 to complete this task. As discussed above, the amount of data received in real-time is large and can affect the processing of the data.

Aspects of the present disclosure address the above deficiency of conventional systems. In particular, in one implementation, the event processing system 110 identifies real-time data based on process events associated with identified defects in a manufacturing process executed by the manufacturing system 100. In this implementation, the event processing system 110 identifies potential process defects in real-time during execution of a manufacturing process, permitting remedial action to be taken before the manufacturing process has completed, rather than relying solely on end-of-the-line analysis. In one implementation, the event processing system 110 can include a rule execution module 120 and a memory 130.

The rule execution module 120 can present a user interface to identify one or more process events for the event processing system 110. The process events for the event processing system 110 can define data that is associated with an identified defect in a manufacturing process executed by the manufacturing system 100. The process events can be obtained from a user (e.g., system engineer, process engineer, industrial engineer, system administrator, etc.) or can be received from a data analytics system. Rule execution module 120 can utilize the identified process events to create an event rule defining how to identify the process event in the manufacturing system 100. The event rule can be stored in event rules 132.

The rule execution module 120 can receive a real-time data stream from the one or more manufacturing data sources 105. The real-time data stream includes manufacturing data elements that can be collected by the rule execution module 120. For example, the data stream can include temperature change readings, pressure change readings, electrical current change readings, data describing the handling of a wafer or die by a specific tool in the manufacturing process, maintenance events for a specific tool in the manufacturing process, or alarms generated by a specific tool in the manufacturing process. The rule execution module 120 can analyze the real-time data stream to identify real-time data from the manufacturing data sources 105 to collect. The rule execution module 120 can identify the real-time data that satisfies one or more event rules in the event rules 132 as real-time data to store in the storage 131 in memory 130. In some implementations, the rule execution module 120 can perform a predefined action upon determining that an event rule has been satisfied by the real-time data during execution of the manufacturing process by the manufacturing system 100. For example, the predefined action is an audio alarm (e.g., a bell, a siren, etc.), a visual alert (e.g., a flashing light), an electronic notification (e.g., an email, a text message etc.), etc. In another example, a predefined action includes the suspension of all or a portion of the manufacturing process. For example, upon determining that an event rule has been satisfied, the rule execution module 120 can suspend the manufacturing process in the manufacturing system 100 so that remedial action may be taken before the manufacturing process has completed in order to prevent a defect from occurring in the finished product produced by the manufacturing process.

The rule execution module 120 can continuously apply the event rules 132 to the real-time data stream associated with the manufacturing data sources 105. As the event rules in the event rules 132 are updated or new event rules are added (e.g., by a user or an analytics system), the rule execution module 120 can apply the updated event rules and/or new event rules to the data stored in storage 131 to determine if previously collected real-time data satisfies the updated event rules and/or the new event rules. Moreover, as the event rules are updated or new event rules are added, the rule execution module 120 can apply the event rules to the data in manufacturing historical data storage 140 to determine if data in the manufacturing historical data storage 140 satisfies the event rules and should be processed and/or analyzed (e.g., if a predefined event is performed based on the event rules, etc.).

Figure 2:
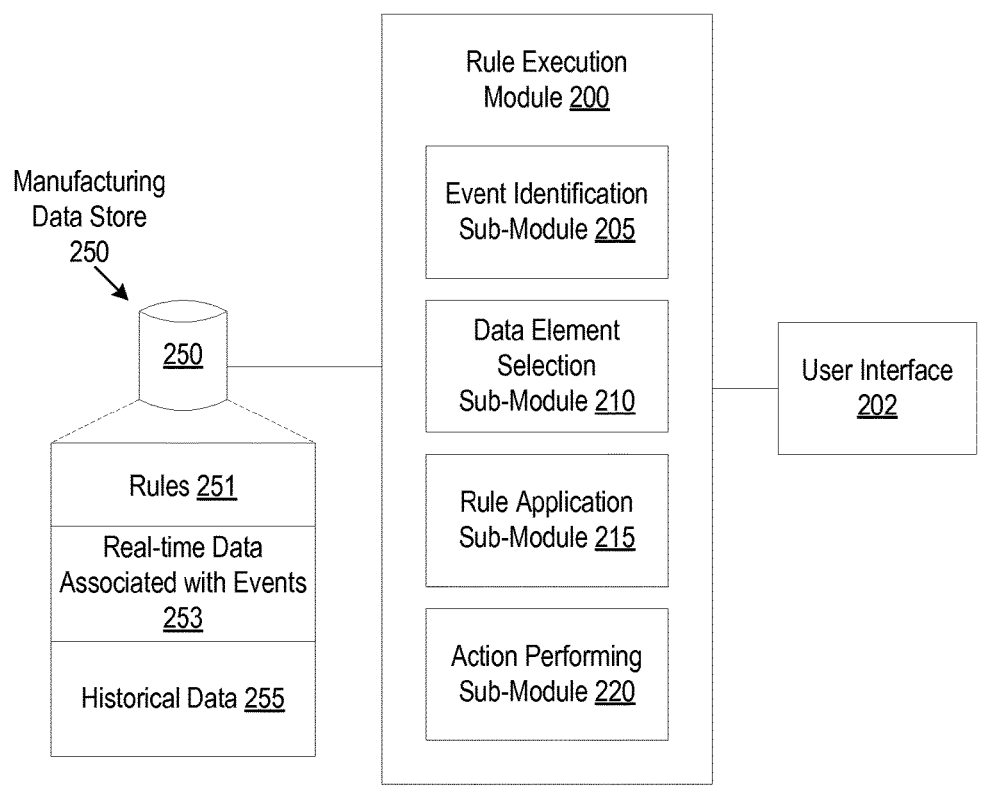
FIG. 2 a block diagram of a rule execution module in accordance with an implementation.

FIG. 2 a block diagram of a rule execution module 200 in accordance with an implementation. In one implementation, the rule execution module 200 can be the same as the rule execution module 120 of FIG. 1. The rule execution module 200 can include an event identification sub-module 205, a data element selection sub-module 210, a rule application sub-module 215, and an action performing sub-module 220.

The rule execution module 200 can be coupled to manufacturing data store 250. The manufacturing data store 250 can be a data store that is resident in memory. The manufacturing data store 250 can include an in-memory non-distributed cache, an in-memory distributed cache, an in-memory graph database, etc. The manufacturing data store 250 can further include an in-memory database such as an on-line transaction processing refined database, an on-line analytics refined database, etc. In some implementations, the manufacturing data store 250 is also a persistent storage, such as an in-memory database that persists data on disk. A persistent storage unit can be a local storage unit or a remote storage unit. A persistent storage unit can also be a magnetic storage unit, optical storage unit, solid state storage unit, electronic storage unit (main memory) or similar storage unit. A persistent storage unit can also be a monolithic device or a distributed set of devices. A 'set', as used herein, refers to any positive whole number of items. The manufacturing data store 250 can include rules 251, real-time data associated with events 253, and historical data 255.

One or more event rules for the manufacturing facility can be defined in the rules 251. The rules 251 can be predefined and/or user (e.g., system engineer, process engineer, industrial engineer, system administrator, etc.) defined. The rules 251 can be based on one or more process events that are associated with an identified manufacturing process defect. The rules 251 can define the conditions corresponding to the process event to be determined to occur in the manufacturing facility. The rules 251 can define the data to be collected from the manufacturing facility to identify and resolve the process events, which represent common failure modes in the manufacturing facility. In one implementation, the rules 251 are in equation form. In an alternate implementation, the rules 251 are in graphical form. The historical data 255 can include all data associated with a particular manufacturing process or defect identified in the rules 251.

In one implementation, the rule execution module 200 presents a user interface 202 to obtain the rules associated with the manufacturing facility. Upon receiving one or more rules associated with the manufacturing facility via user interface 202, the rule execution module 200 can cause the rules to be stored in data storage, such as rules 251 in manufacturing data store 250. In one implementation, the user interface 202 can be a graphical user interface (GUI).

In an alternate implementation, the event identification sub-module 205 identifies a process event associated with an identified defect in a manufacturing process in a manufacturing facility and generates an event rule based on the process event. The event identification sub-module 205 can store the one or more event rules that define the conditions corresponding to the process event to be determined to occur in the manufacturing facility. In one implementation, the event rule is stored in a data store, such as rules 251 of manufacturing data store 250. In one implementation, the manufacturing process is a semiconductor manufacturing process. In one implementation, a process event can include a temperature change, a pressure change, an electrical current change, the handling of a wafer or die by a specific tool in the manufacturing process, a maintenance event for a specific tool in the manufacturing process, or an alarm generated by a specific tool in the manufacturing process.

The event identification sub-module 205 can identify a process event by receiving process event information from a user via user interface 202. For example, an engineer in a manufacturing facility with knowledge of the particular events associated with a known defect in a wafer can send a process event for the known defect to the event identification sub-module 205 via a graphical user interface, such as user interface 202. In another example, if a particular tool in a manufacturing facility produced a known defective batch of wafers, and that tool had reported an extreme change in pressure during the manufacturing process of the defective batch of wafers, an administrator or engineer may input process events indicating the extreme change in pressure in a graphical user interface, such as user interface 202, to be received by event identification sub-module 205. In another implementation, event identification sub-module 205 receives information associated with one or more process events from a data analytics system. For example, event identification sub-module 205 can receive a process event based on examination of historical data in a data store, such as manufacturing historical data storage 140 of FIG. 1.

The data element selection sub-module 210 can select data elements from manufacturing data sources (such as manufacturing data sources 105 of FIG. 1) based on the event rules in rules 251. The data element selection sub-module 210 can select the data elements in real-time during the execution of a manufacturing process. In one implementation, data element selection sub-module 210 can examine the real-time data portion associated with a manufacturing data source and determine whether the real-time data portion compares in a predefined manner to a component of an event rule stored in rules 251. If the real-time data portion compares in a predefined manner to a component of an event rule, data element selection sub-module 210 can select that data portion as a data element. The data element selection sub-module 210 can compare the real-time data portion in a predefined manner to the components of an event rule by determining if the data element is in a specified category associated with the component of the event rule. For example, if an event rule compares the temperature of a tool to a threshold, a component of the event rule is a temperature measurement. In this example, the data element selection sub-module 210 may determine the real-time data portions that are temperature measurements as comparing in a predefined manner to a component of the event rule. The data element selection sub-module 210 can compare the real-time data portion in a predefined manner to the components of an event rule by comparing the real-time data portion to a specified threshold. For example, if an event rule compares the temperature of a tool to a threshold, a component of the event rule is the comparison to a threshold. In this example, the data element selection sub-module 210 may determine the real-time data portions that contain a temperature measurement within the threshold (e.g., within 10 degrees of the threshold) as comparing in a predefined manner to a component of the event rule. For example, if event identification sub-module 205 created an event rule with a process event relating to the temperature changes of a particular tool in the manufacturing process, data element selection sub-module 210 can select the data elements associated with temperature changes for that particular tool from the manufacturing data sources during execution of the manufacturing process.

In some implementations, data element selection sub-module 210 can store the real-time data selected from the manufacturing data sources in the real-time data associated with events 253 portion of manufacturing data store 250.

The rule application sub-module 215 can apply an event rule in rules 251 to data elements selected in real-time from the manufacturing data sources in real-time data associated with events 253. During execution of the manufacturing process, the rule application sub-module 215 can compare the identified event rule to the data elements selected in real-time to determine whether the event rule has been satisfied by the selected data elements. In one implementation, the rule application sub-module 215 can determine whether the event rule is satisfied by comparing the selected data elements to a specified threshold, such as if a data element contains a temperature measurement within 10 degrees of a particular setpoint. For example, if an event rule includes a temperature change over a temperature threshold of a particular tool in the manufacturing process, the rule application sub-module 215 may examine the real-time temperature data generated by that tool. In this example, the rule application sub-module 215 then compares the actual measured temperature with the temperature threshold value in the event rule to determine whether the measured temperature was within or exceeded that threshold.

The action performing sub-module 220 can perform a predefined action during the manufacturing process if the event rule has been satisfied. In one implementation a predefined action can be an audio alarm, such as a bell, siren, etc. In another implementation, a predefined action can be a visual alert, such as a flashing light, etc. In another implementation, a predefined action can be an electronic notification, such as an email, text message, etc. In another implementation, a predefined action can include the suspension of all or a portion of the manufacturing process. For example, in the temperature change example above, if the measured temperature of the tool was greater than the threshold in the event rule, action performing sub-module 220 can signal an alarm during the execution of the manufacturing process. This would allow remedial action to be taken before the manufacturing process has completed, thus preventing a possible manufacturing defect from occurring.

Figure 3:
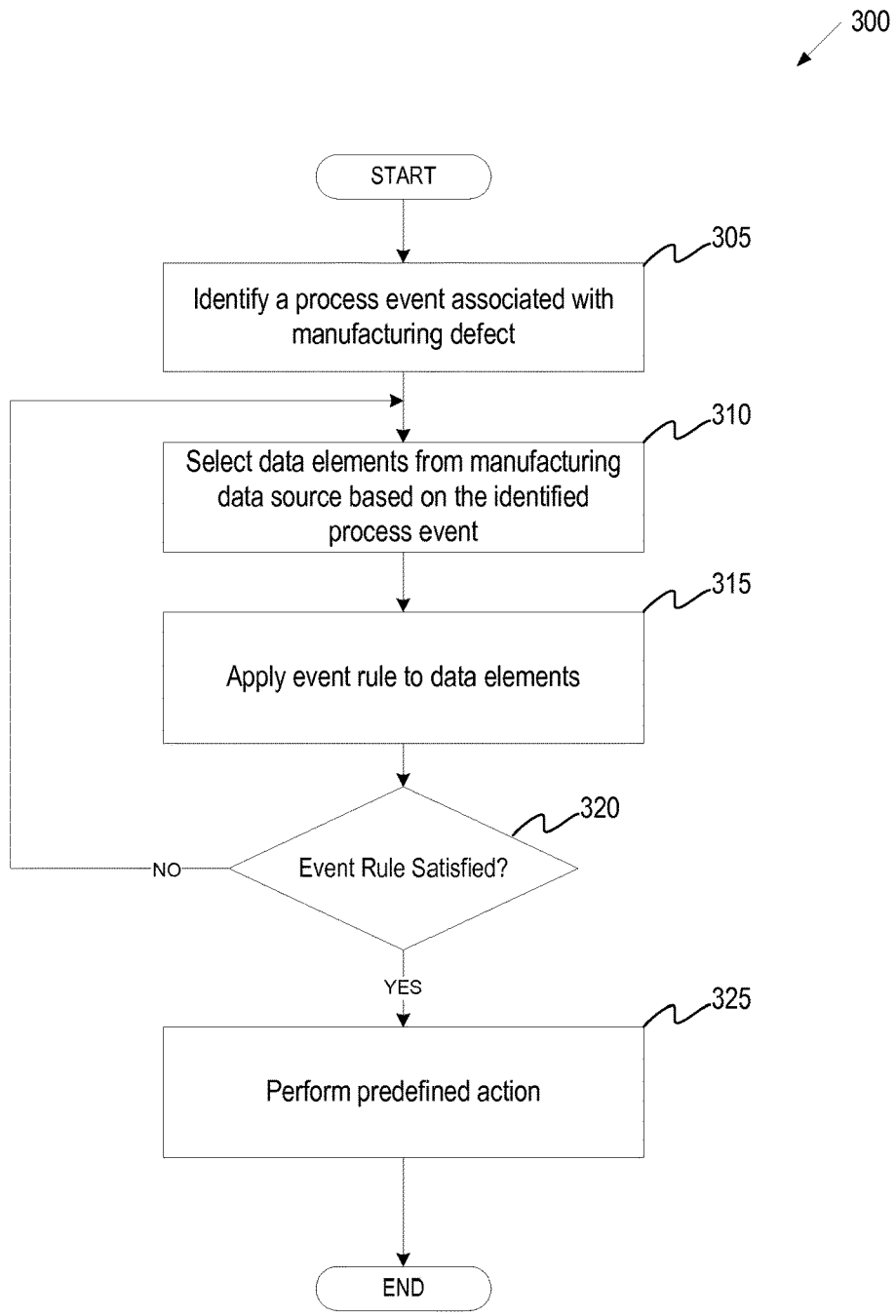
FIG. 3 illustrates a method for real-time event processing during execution of a manufacturing process in accordance with an implementation.

FIG. 3 illustrates a method 300 for real-time event processing during execution of a manufacturing process in accordance with an implementation. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by the rule execution module 120 in event processing system 110 of FIG. 1.

At block 305, processing logic identifies a process event associated with a manufacturing defect. The process event associated with manufacturing defect can be based on an identified defect in a manufacturing process in a manufacturing facility. In one implementation, the manufacturing process is a semiconductor manufacturing process. In an alternate implementation, the manufacturing process is a liquid crystal display (LCD) manufacturing process. In another alternate implementation, the manufacturing process is a solar panel manufacturing process. The manufacturing process can be another type of discrete manufacturing process where a large volume of data is available from manufacturing tools without departing from the scope of the present disclosure. A process event can include a temperature change, a pressure change, an electrical current change, the handling of a wafer or die by a specific tool in the manufacturing process, a maintenance event for a specific tool in the manufacturing process, an alarm generated by a specific tool in the manufacturing process, etc.

In one implementation, processing logic identifies the process event by receiving the process event from a user via a user interface. For example, an engineer in a manufacturing facility (who may have knowledge of the particular process events associated with a known defect in a wafer) inputs the process events via a graphical user interface. In another implementation, processing logic receives the process events from a data analytics system. In an alternate implementation, processing logic receives the process events from an automated tool in the manufacturing facility.

At block 310, processing logic selects data elements from a manufacturing data source based on the identified process event. In one implementation, processing logic selects the data elements in real-time during the execution of a manufacturing process. In one implementation, processing logic examines the real-time data portion associated with a manufacturing data source and determines whether the real-time data portion compares in a predefined manner to a component of an event rule. If the real-time data portion compares in a predefined manner to a component of an event rule, processing logic can select that data portion as a data element. Processing logic can compare the real-time data portion in a predefined manner to the components of an event rule by determining if the data element is in a specified category associated with the component of the event rule. For example, if an event rule compares the temperature of a tool to a threshold, a component of the event rule is a temperature measurement. In this example, processing logic may determine the real-time data portions that are temperature measurements as comparing in a predefined manner to a component of the event rule. Processing logic can compare the real-time data portion in a predefined manner to the components of an event rule by comparing the real-time data portion to a specified threshold. For example, if an event rule compares the temperature of a tool to a threshold, a component of the event rule is the comparison to a threshold. In this example, processing logic may determine the real-time data portions that contain a temperature measurement within the threshold (e.g., within 10 degrees of the threshold) as comparing in a predefined manner to a component of the event rule. For example, for an event rule with a process event relating to the temperature changes of a particular tool in the manufacturing process, processing logic can select the data elements associated with temperature changes for that particular tool from the manufacturing data sources during execution of the manufacturing process.

In one implementation, processing logic determines whether historical data is to be utilized based on the process event. Processing logic can determine if historical data is to be utilized based on the process event by analyzing a rule associated with the process event and determining if additional data is to be utilized based on the rule. For example, a process event is triggered because conditions X, Y, and Z were met for Lot A, but the rule associated with the event also utilizes information on a state of the manufacturing facility when Lot A started the manufacturing process one week ago. In this example, processing logic may determine that the historical information on the state of the manufacturing facility from one week ago is to be utilized. In one implementation, processing logic determines whether historical data is to be utilized by determining if data causing the event to occur is not in a first level of storage. The first level of can be an in-memory storage, such as an in-memory cache. For example, if the event occurs because conditions X, Y, and Z were met, but data associated with condition Y is not in the in-memory cache, processing logic determines that historical data is to be utilized to analyze the event. In one implementation, processing logic determines whether historical data is to be utilized by determining if data causing the event to occur is not in the memory-resident storage.

If processing logic determines that historical data is to be utilized for the event, processing logic can obtain the historical data for the event from data storage (e.g., memory-resident data storage). In some implementations, the historical data is combined with real-time data obtained from memory-resident storage. If processing logic determined that historical data is to be utilized because the historical data is not in a first level of the memory-resident storage, processing logic can obtain the historical data from a second level of the memory-resident storage, such as an in-memory distributed database, etc. If processing logic determined that historical data is to be utilized because data causing the event to occur is not in the memory-resident storage, processing logic can obtain the historical data from distributed or referential storage, such as a distributed database accessible to the manufacturing facility.

At block 315, processing logic applies an event rule to the data elements selected in block 310. The event rule can include one or more conditions required to occur in the manufacturing process in order for an event to be determined to have occurred during a manufacturing process performed in a manufacturing facility. For example, an event rule includes that the temperature in tool A in the manufacturing facility is 100 degrees and that the wafer was in tool A for more than 2 hours. In this example, in order for the event rule to be satisfied, the temperature in tool A in the manufacturing facility must be 100 degrees and the wafer must have been in tool A for more than 2 hours. If each of the conditions in the event rule occur during execution of the manufacturing process, the event rule is satisfied, meaning that the event has occurred during execution of the manufacturing process. The event can be a failure, a lot moving into a specific tool, a lot completing the manufacturing process, etc. Processing logic can apply an event rule to data elements selected in real-time from the manufacturing data sources. During execution of the manufacturing process, processing logic can compare the identified event rule to the data elements selected in real-time to determine whether the event rule has been satisfied by the selected data elements. In one implementation, processing logic can determine whether the event rule is satisfied by comparing the selected data elements to a specified threshold, such as if a data element contains a temperature measurement within 10 degrees of a particular threshold. For example, if an event rule includes a temperature change over a temperature threshold of a particular tool in the manufacturing process, processing logic may examine the real-time temperature data generated by that tool. In this example, processing logic then compares the actual measured temperature with the temperature threshold value in the event rule to determine whether the measured temperature was within or exceeded that threshold.

At block 320, processing logic determines whether or not the event rule has been satisfied. Processing logic can determine whether an event occurred by determining if each of the conditions defined in the event rule have occurred in or been satisfied during execution of the manufacturing process. If each condition defined by the event rule have occurred or been satisfied, processing logic can determine that the event has been satisfied. For example, an event is based on a failure mode defined by a rule in which conditions X, Y, and Z are to occur during the manufacturing process. In this example, if conditions X, Y, and Z occur during execution of the manufacturing process, the rule is satisfied and the event is determined to have occurred. In this example, if processing logic determines that the rule is not satisfied (e.g., one or more of conditions X, Y, and Z have not been satisfied), processing logic may determine that the event has not occurred. If processing logic determines that the event rule is not satisfied, and therefore the event associated with the rule has not occurred, the method 300 returns to block 310 to select additional data elements from the manufacturing data source based on the identified process event. If processing logic determines that the rule is satisfied, and therefore the event has occurred, the method 300 proceeds to block 325.

At block 325, processing logic performs a predefined action. In one implementation, a predefined action is an audio alarm, such as a bell, siren, etc. In another implementation, a predefined action is a visual alert, such as a flashing light, etc. In another implementation, a predefined action is an electronic notification, such as an email, text message, etc. In another implementation, a predefined action suspends all or a portion of the manufacturing process. For example, if the measured temperature of a tool was greater than the threshold in an event rule, processing logic signals an alarm during the execution of the manufacturing process. Remedial action can then be taken before the manufacturing process has completed, thus preventing a possible manufacturing defect from occurring.

Figure 4:
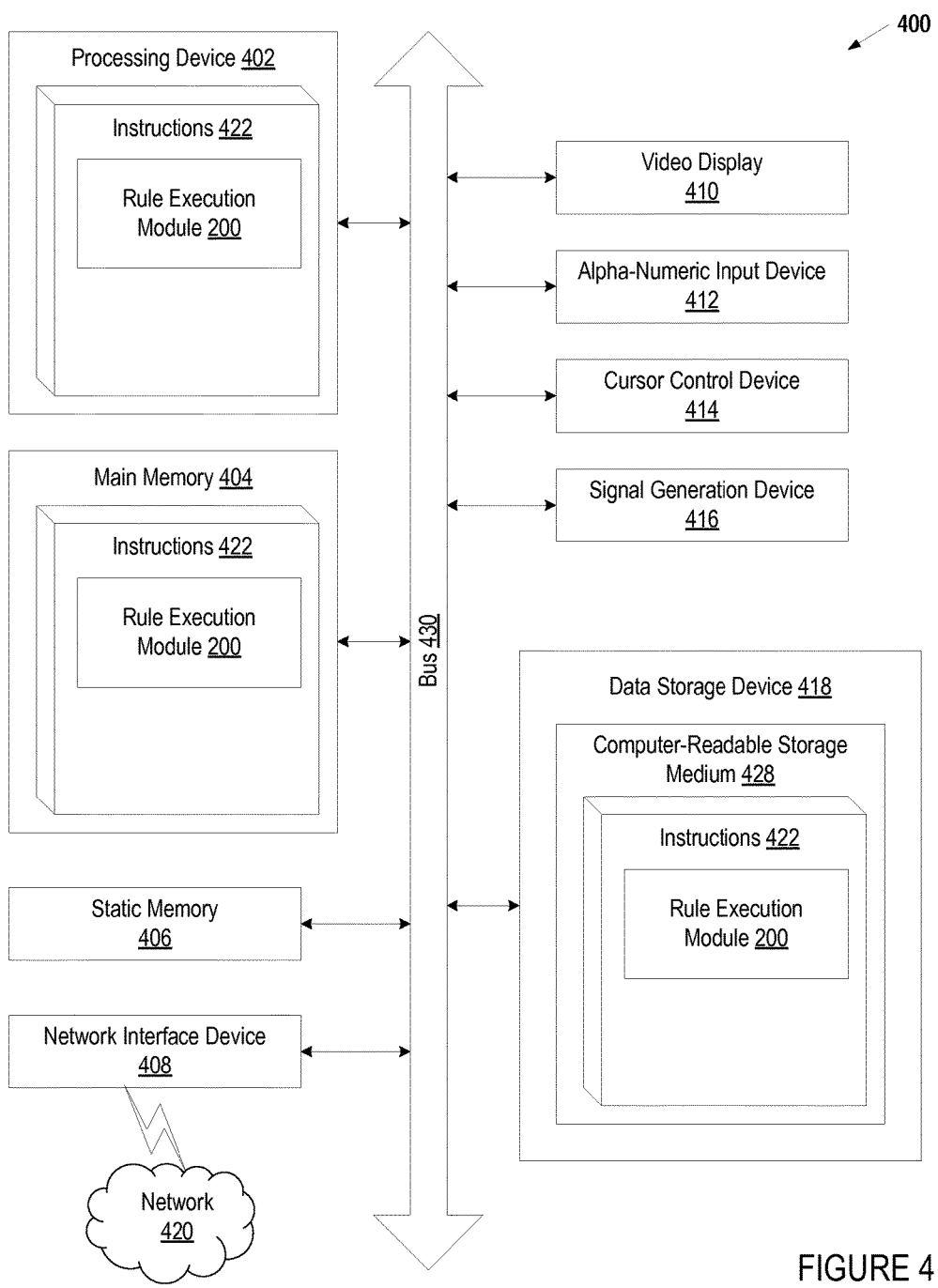
FIG. 4 illustrates an example computer system for use in accordance with some implementations.

FIG. 4 illustrates an example computer system 400 for use in accordance with some implementations. In one implementation, the computing device corresponds to a computing device hosting a rule execution module 200 of FIG. 2. The computing system 400 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the rule execution module 200 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions (instructions of rule execution module 200) embodying any one or more of the methodologies or functions described herein. The rule execution module 200 may also reside, completely or at least partially, within the main memory 404 and/or within the processing device 402 during execution thereof by the computing system 400, the main memory 404 and the processing device 402 also constituting computer-readable storage media. The rule execution module 200 may further be transmitted or received over a network 420 via the network interface device 408.

While the computer-readable storage medium 428 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. The term "computer-readable storage medium" shall also be taken to include both transitory and non-transitory computer-readable storage media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "selecting," "applying," "determining," "performing," "causing," "receiving," "retrieving," "obtaining," "transmitting," "defining," "utilizing," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a process event associated with a defect known to potentially occur in a manufacturing process;
   selecting a plurality of data elements from a manufacturing data source based on the process event, wherein the manufacturing data source is associated with the manufacturing process during execution of the manufacturing process, and wherein selecting the plurality of data elements from the manufacturing data source comprises determining whether data to be utilized in applying an event rule associated with the process event is available in a real-time data stream, and in response to the determining:

selecting a subset of the plurality of data elements from a historical data storage in response to determining that some of the data is unavailable in the real-time data stream; or selecting the plurality of data elements from the real-time data stream in response to determining that all of the data is available in the real-time data stream;

during the execution of the manufacturing process, applying, by a processing device, an event rule to the plurality of data elements to determine whether the event rule is satisfied; during the execution of the manufacturing process, performing a predefined action upon determining that the event rule is satisfied, wherein the predefined action is performed before the defect occurs;

during the execution of the manufacturing process, selecting a plurality of additional data elements from the manufacturing data source based on the process event upon determining that the event rule is not satisfied;

during the execution of the manufacturing process, receiving an updated or new event rule; and during the execution of the manufacturing process, applying the updated or new event rule to the plurality of data elements and historical data elements from the historical data storage.

2. The method of claim 1, further comprising:
inserting the plurality of data elements from the manufacturing data source into an in-memory database during execution of the manufacturing process.

3. The method of claim 1, wherein applying the event rule to the plurality of data elements comprises:
comparing the process event to the plurality of data elements from the manufacturing data source during execution of the manufacturing process; and
determining whether the process event compares in a predefined manner to the plurality of data elements from the manufacturing data source during execution of the manufacturing process.

4. The method of claim 1, wherein identifying the process event associated with the identified defect comprises:
obtaining the process event based on historical data, wherein the process event comprises at least one of a temperature change, a pressure change, an electrical current change, handling by a specific tool in the manufacturing process, a maintenance event, or an alarm generated by the specific tool in the manufacturing process, and wherein the process event is obtained from at least one of a user or an analytics system.

5. The method of claim 1, wherein selecting the plurality of data elements from the manufacturing data source based on the process event further comprises:
for a data portion of the manufacturing data source,
determining whether the data portion compares in a predefined manner to a component of the event rule, and
selecting the data portion as one of the plurality of data elements upon detecting that the data portion compares in the predefined manner to the component of the event rule.

6. A non-transitory computer-readable storage medium having instructions encoded thereon that, when executed by a processing device, cause the processing device to perform operations comprising:
identifying a process event associated with a defect known to potentially occur in a manufacturing process;
selecting a plurality of data elements from a manufacturing data source based on the process event, wherein the manufacturing data source is associated with the manufacturing process during execution of the manufacturing process, and wherein selecting the plurality of data elements from the manufacturing data source comprises determining whether data to be utilized in applying an event rule associated with the process event is available in a real-time data stream, and in response to the determining:

selecting a subset of the plurality of data elements from a historical data storage in response to determining that some of the data is unavailable in the real-time data stream; or selecting the plurality of data elements from the real-time data stream in response to determining that all of the data is available in the real-time data stream;

during the execution of the manufacturing process, applying, by the processing device, an event rule to the plurality of data elements to determine whether the event rule is satisfied;

during the execution of the manufacturing process, performing a predefined action upon determining that the event rule is satisfied, wherein the predefined action is performed before the defect occurs; and during the execution of the manufacturing process, selecting a plurality of additional data elements from the manufacturing data source based on the process event upon determining that the event rule is not satisfied;

during the execution of the manufacturing process, receiving an updated or new event rule; and during the execution of the manufacturing process, applying the updated or new event rule to the plurality of data elements and historical data elements from the historical data storage.

7. The non-transitory computer-readable storage medium of claim 6, wherein the operations further comprise:
inserting the plurality of data elements from the manufacturing data source into an in-memory database during execution of the manufacturing process.

8. The non-transitory computer-readable storage medium of claim 6, wherein applying the event rule to the plurality of data elements comprises:
comparing the process event to the plurality of data elements from the manufacturing data source during execution of the manufacturing process; and
determining whether the process event compares in a predefined manner to the plurality of data elements from the manufacturing data source during execution of the manufacturing process.

9. The non-transitory computer-readable storage medium of claim 6, identifying the process event associated with the identified defect comprises:
obtaining the process event based on historical data, wherein the process event comprises at least one of a temperature change, a pressure change, an electrical current change, handling by a specific tool in the manufacturing process, a maintenance event, or an alarm generated by the specific tool in the manufacturing process, and wherein the process event is obtained from at least one of a user or an analytics system.

10. The non-transitory computer-readable storage medium of claim 6, wherein selecting the plurality of data elements from the manufacturing data source based on the process event further comprises:
for a data portion of the manufacturing data source,
determining whether the data portion compares in a predefined manner to a component of the event rule, and selecting the data portion as one of the plurality of data elements upon detecting that the data portion compares in the predefined manner to the component of the event rule.

11. A system comprising: a memory; and a processor communicatively coupled to the memory, wherein the processor is to:
identify a process event associated with a defect known to potentially occur in a manufacturing process;
select a plurality of data elements from a manufacturing data source based on the process event, wherein the manufacturing data source is associated with the manufacturing process during execution of the manufacturing process, and wherein to select the plurality of data elements from the manufacturing data source, the processing device is to further determine whether data to be utilized in applying an event rule associated with the process event is available in a real-time data stream, and in response to the determining:
select a subset of the plurality of data elements from a historical data storage in response to determining that some of the data is unavailable in the real-time data stream; or select the plurality of data elements from the real-time data stream in response to determining that all of the data is available in the real-time data stream;
during the execution of the manufacturing process, apply an event rule to the plurality of data elements to determine whether the event rule is satisfied;
during the execution of the manufacturing process, perform a predefined action upon determining that the event rule is satisfied, wherein the action is performed before the defect occurs;
during the execution of the manufacturing process, select a plurality of additional data elements from the manufacturing data source based on the process event upon determining that the event rule is not satisfied;
during the execution of the manufacturing process, receiving an updated or new event rule; and during the execution of the manufacturing process, applying the updated or new event rule to the plurality of data elements and historical data elements from the historical data storage.

12. The system of claim 11, wherein to apply the event rule to the plurality of data elements, the processor is to:
compare the process event to the plurality of data elements from the manufacturing data source during execution of the manufacturing process; and
determine whether the process event compares in a predefined manner to the plurality of data elements from the manufacturing data source during execution of the manufacturing process.

13. The system of claim 11, wherein to identify the process event associated with the identified defect, the processor is to:
obtain the process event based on historical data, wherein the process event comprises at least one of a temperature change, a pressure change, an electrical current change, handling by a specific tool in the manufacturing process, a maintenance event, or an alarm generated by the specific tool in the manufacturing process, and wherein the process event is obtained from at least one of a user or an analytics system.

14. The system of claim 11, wherein to select the plurality of data elements from the manufacturing data source based on the process event, the processor is to further:
for a data portion of the manufacturing data source,
determine whether the data portion compares in a predefined manner to a component of the event rule, and
select the data portion as one of the plurality of data elements upon detecting that the data portion compares in the predefined manner to the component of the event rule.

* * * * *